US012266809B2

(12) United States Patent
Sakamoto et al.

(10) Patent No.: US 12,266,809 B2
(45) Date of Patent: Apr. 1, 2025

(54) POWER SUPPLY DEVICE

(71) Applicants: Panasonic Corporation, Osaka (JP); SANYO Electric Co., Ltd., Osaka (JP)

(72) Inventors: Tomonori Sakamoto, Osaka Fu (JP); Akio Yamasaki, Osaka Fu (JP); Kazuhiro Kawamura, Hyogo Ken (JP); Koichi Sawada, Osaka Fu (JP); Chifumi Murayama, Osaka Fu (JP)

(73) Assignees: PANASONIC HOLDINGS CORPORATION, Osaka (JP); PANASONIC ENERGY CO., LTD, Osaka (JP)

( * ) Notice: Subject to any disclaimer, the term of this patent is extended or adjusted under 35 U.S.C. 154(b) by 235 days.

(21) Appl. No.: 17/430,860

(22) PCT Filed: Feb. 7, 2020

(86) PCT No.: PCT/JP2020/004771
§ 371 (c)(1),
(2) Date: Aug. 13, 2021

(87) PCT Pub. No.: WO2020/166501
PCT Pub. Date: Aug. 20, 2020

(65) Prior Publication Data
US 2022/0149468 A1 May 12, 2022

(30) Foreign Application Priority Data
Feb. 15, 2019 (JP) .................... 2019-025557

(51) Int. Cl.
*H01M 50/209* (2021.01)
*H01M 50/204* (2021.01)
(Continued)

(52) U.S. Cl.
CPC ....... *H01M 50/209* (2021.01); *H01M 50/204* (2021.01); *H01M 50/227* (2021.01);
(Continued)

(58) Field of Classification Search
CPC ............. H01M 50/209; H01M 50/227; H01M 50/298; H01M 50/204; H01M 50/317; H01M 50/367
See application file for complete search history.

(56) References Cited

U.S. PATENT DOCUMENTS

| 9,553,290 B2 * | 1/2017 | Nagano ................. H01M 50/30 |
| 2009/0220851 A1 * | 9/2009 | Nakazawa ............ H01M 50/30 |
| | | 429/58 |

(Continued)

FOREIGN PATENT DOCUMENTS

| JP | 2017-152162 | 8/2017 |
| JP | 2018-527704 | 9/2018 |

(Continued)

OTHER PUBLICATIONS

International Search Report issued Apr. 28, 2020 in International (PCT) Application No. PCT/JP2020/004771.

*Primary Examiner* — Milton I Cano
*Assistant Examiner* — Albert Michael Hilton
(74) *Attorney, Agent, or Firm* — Wenderoth, Lind & Ponack, L.L.P.

(57) ABSTRACT

A power supply device includes a plurality of batteries and an exterior case. Each of the plurality of batteries includes an exhaust valve configured to open if an internal pressure becomes higher than a predetermined pressure. The exterior case accommodates the plurality of batteries and includes a collision-enhancing gas-releasing path for releasing a gas discharged through the exhaust valve to the outside of the exterior case. The collision-enhancing releasing path
(Continued)

includes a first collision plate and a second collision plate configured such the gas collides against the first collision plate and the second collision plate and is then released to the outside of the exterior case. The first collision plate is configured to reflect a flow direction of the gas by collision of the gas against a surface of the first collision plate. The second collision plate faces the first collision plate.

20 Claims, 6 Drawing Sheets

(51) Int. Cl.
  *H01M 50/227* (2021.01)
  *H01M 50/298* (2021.01)
  *H01M 50/317* (2021.01)
  *H01M 50/367* (2021.01)

(52) U.S. Cl.
  CPC ....... *H01M 50/298* (2021.01); *H01M 50/317* (2021.01); *H01M 50/367* (2021.01)

(56) References Cited

U.S. PATENT DOCUMENTS

| 2012/0164490 A1* | 6/2012 | Itoi | H01M 50/358 |
| | | | 429/82 |
| 2017/0244081 A1 | 8/2017 | Tononishi et al. | |
| 2018/0108892 A1 | 4/2018 | Kim et al. | |

FOREIGN PATENT DOCUMENTS

| KR | 10-2017-0090261 | 8/2017 |
| WO | 2007/039999 | 4/2007 |

* cited by examiner

POWER SUPPLY DEVICE

CROSS-REFERENCE TO RELATED APPLICATIONS

The present application is a PCT National Phase Entry of PCT/JP2020/004,771, file on Feb. 7, 2020, which claims priority under 35 U. S. C. § 119 to Japanese Patent Application No. 2019-025,557, filed on Feb. 15, 2019, the content of which is incorporated herein by reference in their entirety.

BACKGROUND

1. Technical Field

The present disclosure relates to a power supply device including an exterior case and batteries accommodated in the exterior case, and more particularly to a power supply device including an exterior case and batteries having their exhaust valve that is accommodated in the exterior case and will open if their internal pressure becomes higher than a predetermined pressure.

2. Description of Related Art

Rechargeable batteries including an exhaust valve, which will open if their internal pressure becomes higher than a predetermined pressure, are known. These rechargeable batteries have improved safety because the exhaust valve will open if their internal pressure becomes extremely high. Power supply devices that accommodate these rechargeable batteries in their exterior case are importantly required to safely discharge a gas discharged from the exhaust valve to the outside of the exterior case. In particular, in the case in which such a rechargeable battery includes a non-aqueous electrolyte, a high temperature gas evaporating from the electrolyte is discharged to the outside of the exterior case. At this time, sparks may be emitted to the outside of the exterior case. If the high temperature gas discharged to the outside of the exterior case remains on the outside of the exterior case, and sparks are emitted to the outside of the exterior case, the gas may be burned on the outside of the exterior case. To avoid these disadvantages, a power supply device that includes a plate having a number of through holes on a gas-releasing path in order to release such a gas, which is discharged through exhaust valves of its batteries, to the outside of its exterior case (see Japanese Patent Laid-Open Publication No. JP 2017-152 162 A).

However, the power supply device disclosed in JP 2017-152 162 A, which includes the plate having a number of through holes for releasing a high temperature gas discharged through the exhaust valves to the outside of the exterior case, cannot cool the discharged gas to a safe temperature. That is, this power supply device may not safely release such a high temperature discharged gas to the outside of the exterior case.

It is an object of the present disclosure to provide a power supply device which has a simple structure capable of being inexpensively mass-produced but can cool a discharged gas to a safe temperature and reduce sparks that are emitted to the outside of its exterior case to prevent the discharged gas from being burned by the sparks whereby improving its safety.

SUMMARY

A power supply device according to the present disclosure includes a plurality of batteries and an exterior case. Each battery includes an exhaust valve that opens if an internal pressure becomes higher than a predetermined pressure. The exterior case accommodates the batteries. The exterior case includes a collision-enhancing type gas-releasing path that releases a gas discharged through the exhaust valve to the outside. First and second collision plates are provided in the releasing path 4. The first collision plate reflects a flowing direction of the gas discharged through the exhaust valve in collision of the gas against a surface of the first collision plate. The second collision plate faces the first collision plate. The gas discharged through the exhaust valve collides against the first and second collision plates and is then released to the outside of the exterior case.

A power supply device according to the present disclosure has a simple structure capable of being inexpensively mass-produced but can cool high-temperature discharged gas that is discharger through its exhaust valve to a safe temperature and reduce sparks that are emitted to the outside of its exterior case whereby improving its safety.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION

The following description will describe a power supply device according to the present disclosure with reference to the drawings. In the following description, although terms for indicating particular directions or positions (e.g., "upper" and "lower", and other terms including these terms) will be used as necessary for ease of understanding the present with reference to the drawings, the technical scope of the present disclosure is not limited by these terms. Portions attached with the same reference sign in different drawings show the portions or members same as or similar to each other.

It should be appreciated, however, that an embodiment described below is illustrations of a power supply device to give a concrete form to technical ideas of the invention, and a power supply device of the invention is not specifically limited to description below. Unless otherwise specified, any dimensions, materials, shapes and relative arrangements of the parts described below are given as an example and not as a limitation. In addition, the description for one embodiment may be applied to other embodiments or examples. Additionally, the sizes and the arrangement relationships of the members in the drawings are occasionally exaggerated for ease of explanation.

A power supply device according to a first aspect of the present disclosure includes a plurality of batteries and an exterior case. Each battery includes an exhaust valve that opens if an internal pressure becomes higher than a predetermined pressure. The exterior case accommodates the batteries. The exterior case includes a collision-enhancing type gas-releasing path that releases a gas discharged through the exhaust valve to the outside. The collision-enhancing type releasing path includes first and second collision plates. The first collision plate reflects a flowing direction of the gas discharged through the exhaust valve in collision of the gas against a surface of the first collision plate. The second collision plate faces the first collision plate. The gas discharged through the exhaust valve collides against the first and second collision plates and is then released to the outside of the exterior case.

According to the aforementioned power supply device, the first and second collision plates are arranged in the releasing path through which a discharged gas is released to the outside. The first collision plate reflects a flowing direction of the gas, which is discharged through the exhaust valve and flows at a high speed, in collision of the gas against a surface of the first collision plate. The second collision plate faces the first collision plate so that the discharged gas reflected by the first collision plate collides against a surface of the second collision plate before released to the outside. The power supply device, which has this unique structure, can absorb both thermal energy and kinetic energy of a gas that is discharged through the exhaust valve and flows at a high speed by using the first collision plate against which the discharged gas collides, and can then absorb both thermal energy and kinetic energy of the discharged gas by using the second collision plate against which the discharged gas collides before releasing the discharged gas. After collision against the first and second collision plates in which both thermal energy and kinetic energy of the discharged gas are absorbed, the discharged gas that is discharged to the outside is cooled to a lower temperature. Accordingly, the discharged gas can be prevented from being burned when meeting air outside the case. Also, because the discharged gas has reduced kinetic energy, the discharged gas will not be rapidly released. For this reason, even if the exhaust valves open, the aforementioned power supply device can have high safety. In particular, because the first and second collision plates reduce thermal energy and kinetic energy of the discharged gas in collision of the discharged gas against their surfaces, the thermal energy of the discharged gas can be efficiently conducted to the collision plates for the absorption. In addition, the kinetic energy can be efficiently reduced when a flowing direction of the discharged gas is reflected by the collision.

Also, according to the aforementioned power supply device, even if sparks emitted through the exhaust valve of the battery, the sparks will hit the first and second collision plates. Accordingly, a path of the sparks, which will travel in a straight line, can be cut off. In addition, the sparks can be cooled when hitting the collision plates. As a result, the sparks will disappear. Because the sparks, which may cause ignition, cannot be emitted to the outside of the exterior case, even if a high temperature gas that vaporizes from an electrolyte remains on the outside of the exterior case, such a gas will not be burned by the sparks. Therefore, the safety can be improved.

In a power supply device according to a second aspect of the present invention, inlet and outlet ducts are arranged on inlet and outlet sides of the releasing path, respectively. The discharged gas passes through the inlet duct and collides against the surface of the first collision plate. The discharged gas collides against the second collision plate and is released through the outlet duct to the outside of the exterior case.

According to the aforementioned power supply device, the discharged gas can be guided to the inlet duct so that the discharged gas collides against the first collision plate. Accordingly, the discharged gas, which flows at a high speed, can be efficiently brought into collision against the first collision plate. As a result, thermal energy and kinetic energy of the discharged gas can be efficiently reduced before the discharged gas is released to the outside of the case.

In a power supply device according to a third aspect of the present disclosure, a reflection duct and a second guide plate are arranged on the releasing path. The reflection duct guides to the second collision plate the discharged gas reflected in collision against the first collision plate. The second guide plate separates the inlet duct from the reflection duct.

According to the aforementioned power supply device, because the discharged gas that is reflected by the first collision plate and flows in the reflected flowing direction can be guided to the reflection duct, and the inlet duct is separated from the reflection duct by the second guide plate, the collision of the fast-flowing discharged gas after the collision against the first collision plate 11 can be efficiently brought into collision against the second collision plate. As a result, thermal energy and kinetic energy of the discharged gas can be efficiently reduced before the discharged gas is released to the outside of the case.

In a power supply device according to a fourth aspect of the present disclosure, a first guide plate is arranged on the releasing path. The first guide plate is coupled to the first collision plate and extends in parallel to the flowing direction of the discharged gas in the outlet duct. The first guide plate guides, to the second collision plate, the discharged gas reflected in collision against the first collision plate.

According to the aforementioned power supply device, because the discharged gas that is reflected by the first collision plate and flows in the reflected flowing direction can be guided to the reflection duct by the first and second guide plates to collide against the second collision plate, the fast-flowing discharged gas after the collision against the first collision plate 11 can be efficiently brought into collision against the second collision plate. As a result, thermal energy and kinetic energy of the discharged gas can be efficiently reduced before the discharged gas is released to the outside of the case.

In a power supply device according to a fifth aspect of the present disclosure, a sub-plate is arranged between the first and second guide plates on the releasing path. A vertical gap is formed between the sub-plate and the first collision plate to allow the discharged gas to pass through the vertical gap.

In a power supply device according to a sixth aspect of the present disclosure, the first and second collision plates, and the first and second guide plates are coupled to an upper plate of the exterior case without gap on upper edges of the first and second collision plates, and the first and second guide plates. An upper-edge gap is formed between an upper edge of the sub-plate and the upper plate of the exterior case.

According to the aforementioned power supply device, the discharged gas that collides against the first collision plate and then flows in the reflected flowing direction can be divided by the sub-plate. As a result, collision of divided discharged gas flows against the second collision plate can be achieved.

In a power supply device according to a seventh aspect of the present invention, the first and second collision plates, the first and second guide plates, and the sub-plate are formed of a metal plate.

According to the aforementioned power supply device, because the first and second collision plates, and the first and second guide plates are formed of a metal plate, thermal energy of the discharged gas can be efficiently absorbed in collision against surfaces of the first and second collision plates. In addition, the discharged gas can smoothly flow along the first and second guide plates. As a result, the first and second guide plates can also efficiently absorb thermal energy of the discharged gas.

In a power supply device according to an eighth aspect of the present disclosure, the releasing path in the exterior case is one of a plurality of releasing paths for releasing a gas discharged through the exhaust valve to the outside.

According to the aforementioned power supply device, a discharged gas discharged through an exhaust valve arranged in any part of the exterior case can be quickly released to the outside of the case because at least one of releasing paths near the part of the exterior case can firstly release the discharged gas.

In a power supply device according to a ninth aspect of the present invention, the exterior case has a rectangular parallelepiped having a width and a length longer than the width. The releasing path is arranged in each of the longitudinal end parts of the exterior case.

According to the aforementioned power supply device, even if a discharged gas is discharged from the exhaust valve of the battery that is arranged near either longitudinal end of the exterior case, the discharged gas can be quickly released from the longitudinal end of the exterior case, which has such an elongated rectangular parallelepiped.

In a power supply device according to a tenth aspect of the present disclosure, the releasing path is arranged in each of both lateral sides of each of the longitudinal end parts of the exterior case.

According to the aforementioned power supply device, because the releasing path is arranged in each of both lateral sides of the longitudinal end parts of the exterior case, a discharged gas can be more quickly released from the longitudinal end to the outside of the case.

In a power supply device according to an eleventh aspect of the present disclosure, the exterior case has battery accommodation and duct areas. The battery accommodation area accommodates a battery block including the batteries, which are arranged in their predetermined place. The duct area is arranged between the battery accommodation area and an end part of the exterior case. The releasing path is arranged in the duct area.

A power supply device according to a twelfth aspect of the present disclosure further includes a connector that is connected to the battery block by lead wires. The connector is fastened to a part of the exterior case that closes the duct area. The lead wires pass from the inlet duct to the outlet duct of the releasing path, which is arranged in the duct area.

In a power supply device according to a thirteenth aspect of the present disclosure, a wiring releasing path that holds the lead wires, and a non-wiring releasing path without the lead wires inside are provided in the duct area.

According to the aforementioned power supply device, the wiring and non-wiring releasing paths are arranged in the duct area of the exterior case so that the wiring releasing path also serves to route the lead wires. Accordingly, the lead wires can be routed from the battery accommodation area, which accommodates the batteries, to the duct area.

In a power supply device according to a fourteenth aspect of the present disclosure, wiring gaps are formed between an edge of the first guide plate and the second collision plate, and between an edge of the second guide plate and the first collision plate in the wiring releasing path. The edges of the first and second guide plates, which face the second and first collision plates, respectively, are formed by bending their metal plate into a U shape. The lead wires pass through the wiring gaps.

According to the aforementioned power supply device, because the edges of the first and second guide plates that will contact and are likely to damage a surface of an insulating cover of the lead wires are bent into a U shape, the surface of the insulating cover can be prevented from being damaged by contact with either first or second guide plate.

In a power supply device according to a fifteenth aspect of the present disclosure, the second guide plate in the non-wiring releasing path is coupled to the first collision plate, and a passage gap is formed between a lower edge of the second guide plate and a lower plate of the exterior case to allow the discharged gas to pass through the passage gap.

A power supply device according to a sixteenth aspect of the present disclosure further includes a battery holder that is accommodated in the exterior case and holds the batteries in their predetermined place. The inlet duct has a vertically elongated opening that extends in a vertical direction.

According to the aforementioned power supply device, the discharged gas can be reliably released to the outside of the case. Accordingly, even in the case in which a battery holder is made of a thermoplastic resin, which may be melted by a high temperature discharged gas discharged through the exhaust valve, the power supply device can have high safety. The reason is that, even if a lower part of the vertically elongated opening of the inlet duct, which guides the discharged gas to the outside, is closed by the melted thermoplastic resin, the discharged gas can be released through an upper part of the opening.

In a power supply device according to a seventeenth aspect of the present disclosure, the inlet duct in the wiring releasing path includes a vertically elongated opening that extends in a vertical direction.

First Embodiment

Figure 1:
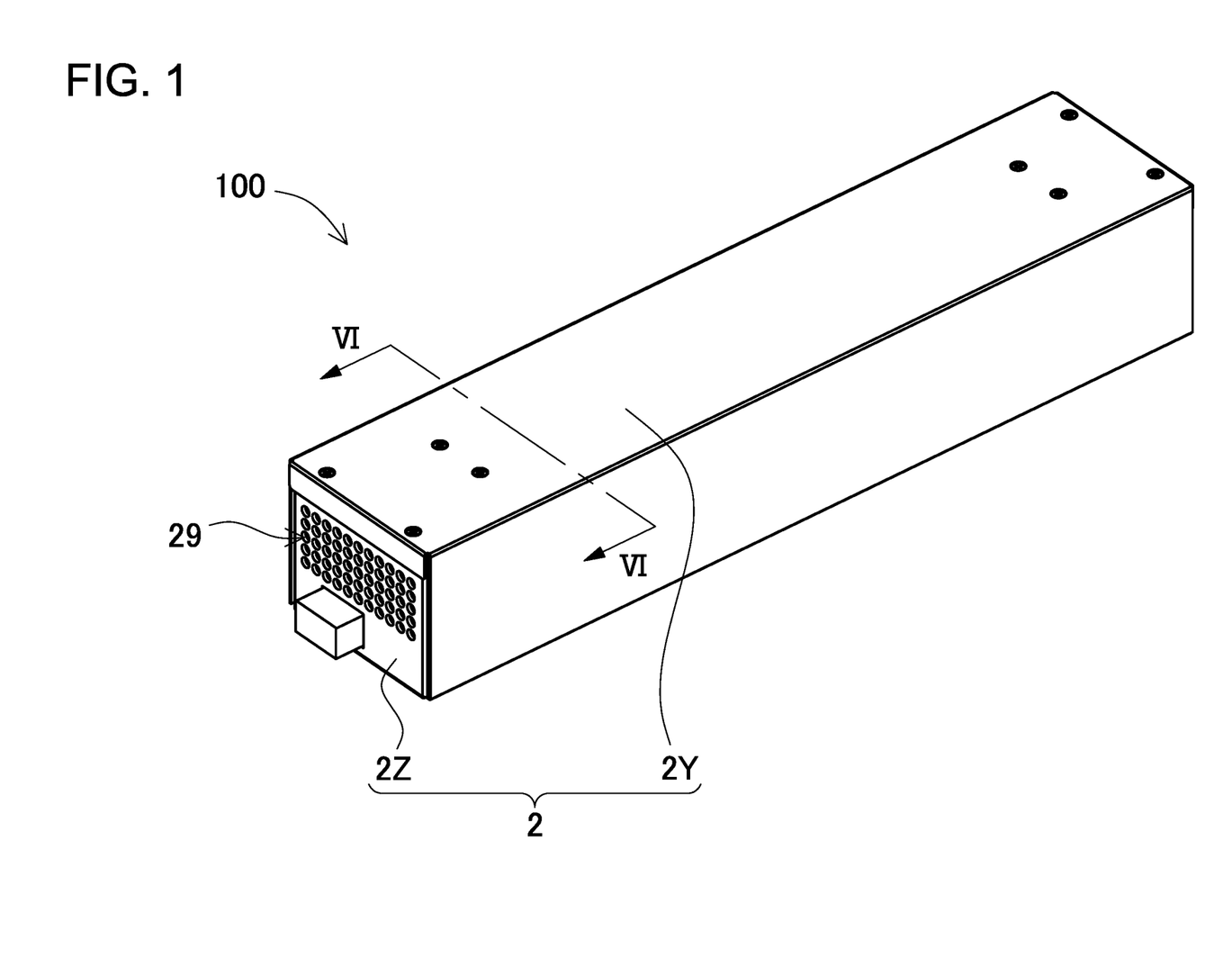
FIG. 1. is a perspective view of a power supply device according to an embodiment.
Figure 2:
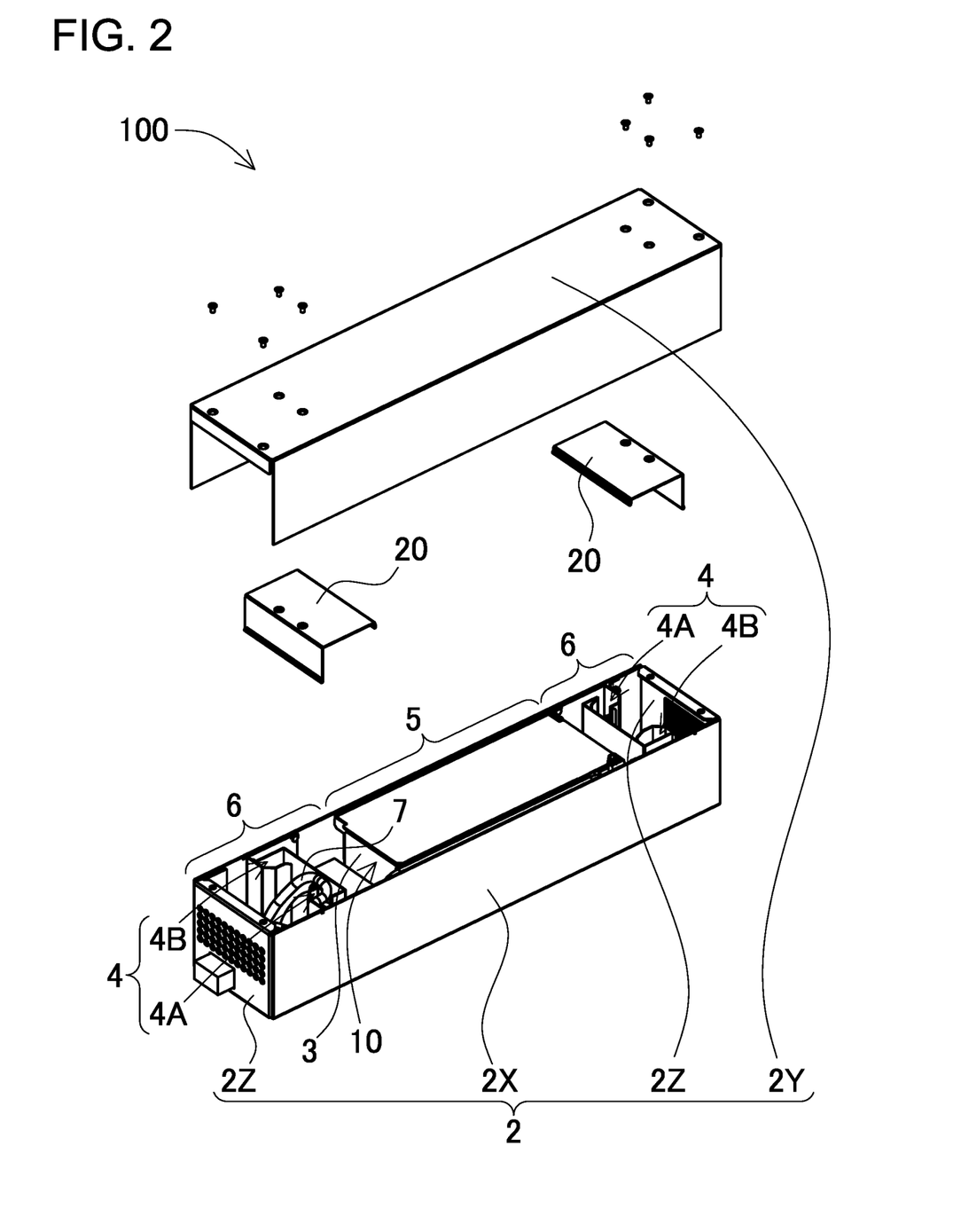
FIG. 2 is an exploded perspective view of the power supply device shown in FIG. 1.
Figure 3:
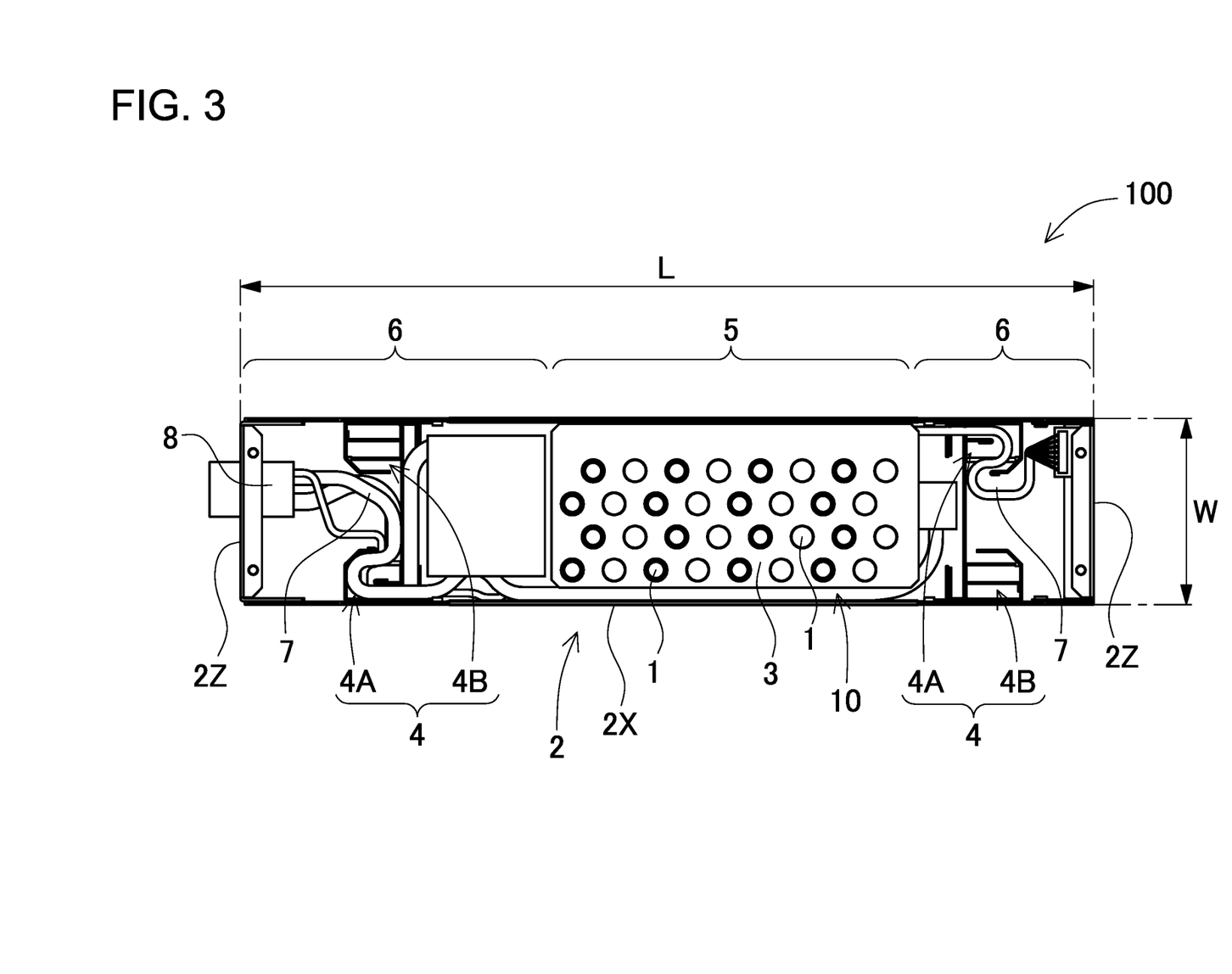
FIG. 3 is a plan view showing an internal structure of the power supply device shown in FIG. 2.

A power supply device 100 shown in FIGS. 1 to 3 includes a plurality of rechargeable batteries 1 and an exterior case 2, which accommodates the batteries 1. The batteries 1 are rechargeable batteries, preferably, non-aqueous electrolyte rechargeable batteries, such as lithium ion batteries, which include an exhaust valve. Non-aqueous electrolyte rechargeable batteries have a large energy density with respect to weight or volume. For this reason, even a small and lightweight non-aqueous electrolyte rechargeable battery can have a relatively large energy density. However, the batteries according to the present disclosure are not limited to a non-aqueous electrolyte rechargeable battery but can be any rechargeable batteries that have been used or will be developed. The exhaust valve of the battery 1 can open if an internal pressure of the battery 1 exceeds a predetermined pressure. Rupture of a battery case can be prevented by the exhaust valve, which opens if the internal pressure becomes higher than the predetermined pressure. If the battery 1 is brought in an abnormal state, the exhaust valve will open. In such an abnormal state, a gas and sparks may be emitted. The gas discharged through the release valve has a high temperature and rapidly flows within a very short time. In a case of lithium ion batteries, if their exhaust valve opens, a gas discharged through the exhaust valves will have a very high temperature, for example, hundreds degrees Celsius. Such a discharged gas may spontaneously ignite if discharged still at a very high temperature to the outside of the exterior case 2. The spontaneous ignition may reduce safety. Even after the discharged gas is cooled lower than the temperature at which it will spontaneously ignite, the discharged gas that has been released to the outside of the exterior case may be burned if an ignition source exists on the outside, for example, if sparks are emitted through the exhaust valves to the outside. The gas starting to burn from the ignition source may reduce safety.

The batteries 1 are held in their predetermined place by a battery holder 3, which is made of plastic, and are accommodated in the exterior case 2. The battery holder 3 is formed of a thermoplastic resins, such as polycarbonate, polyethylene, polypropylene, and nylon, into a shape including engagement portions for arranging the batteries 1 in their predetermined places. The shape of the battery holder 3 does not close openings of the exhaust valves. The batteries 1 and the battery holder 3 form a battery block 10. The batteries 1, which are held in their predetermined places by the battery holder 3, are connected in series and/or parallel to each other by lead plates (not shown), which are connected to terminals of the batteries 1, in the battery block 10. The battery block 10 is connected to a circuit board (not shown) that includes a protection circuit for protecting the batteries 1 and the like, and to a connector 8, which is fastened to the exterior case 2, by lead wires 7. The exterior case 2 in the power supply device 100 shown in FIGS. 1 to 3 has an elongated rectangular parallelepiped. Correspondingly, the battery block 10 has a rectangular parallelepiped exterior shape to be accommodated in the exterior case 2. The battery block 10 is arranged in a central part of the exterior case 2 in the power supply device 100 as shown in FIG. 3.

The exterior case 2 has gas-releasing paths 4. A gas and sparks emitted through the exhaust valves of the batteries 1 can pass through the releasing paths 4 to the outside of the exterior case 2. The illustrated power supply device 100 has a rectangular parallelepiped having a width (W) and a length (L) longer than the width (W). The releasing paths 4 are arranged in both longitudinal end parts of the power supply device 100. The exterior case 2 includes a main case part 2X, end surface plates 2Z, and a lid case part 2Y as shown in FIG. 2. The main case part 2X has a rectangular U shape, which opens upward, as viewed in a transverse cross-sectional view. Both ends of the main case part 2X are closed by the end surface plates 2Z. The lid case part 2Y has a rectangular U shape, which opens downward, as viewed in a transverse cross-sectional view. The opening of the main case part 2X is closed by the lid case part 2Y. Accordingly, the exterior case 2 is formed in the rectangular parallelepiped shape. The elongated rectangular parallelepiped exterior case 2 in the power supply device 100 has a battery accommodation area 5, which is located in a longitudinal central part of the exterior case 2 to accommodate the battery block 10, and duct areas 6, which are located between the battery accommodation area 5 and both ends of the exterior case 2. The releasing path 4 is arranged in each of both lateral sides of each of the duct areas 6, which are located in the longitudinal end parts of the exterior case 2, as shown in FIG. 3 so that the discharged gas can be quickly released from the longitudinal ends of the exterior case 2 to the outside of the case. One of the releasing paths 4 that are located in both lateral sides of each duct area 6 is a wiring releasing path 4A that holds the lead wires 7, and another is a non-wiring releasing path 4B without the lead wires 7 inside as shown in FIGS. 3 and 4.

Figure 4:
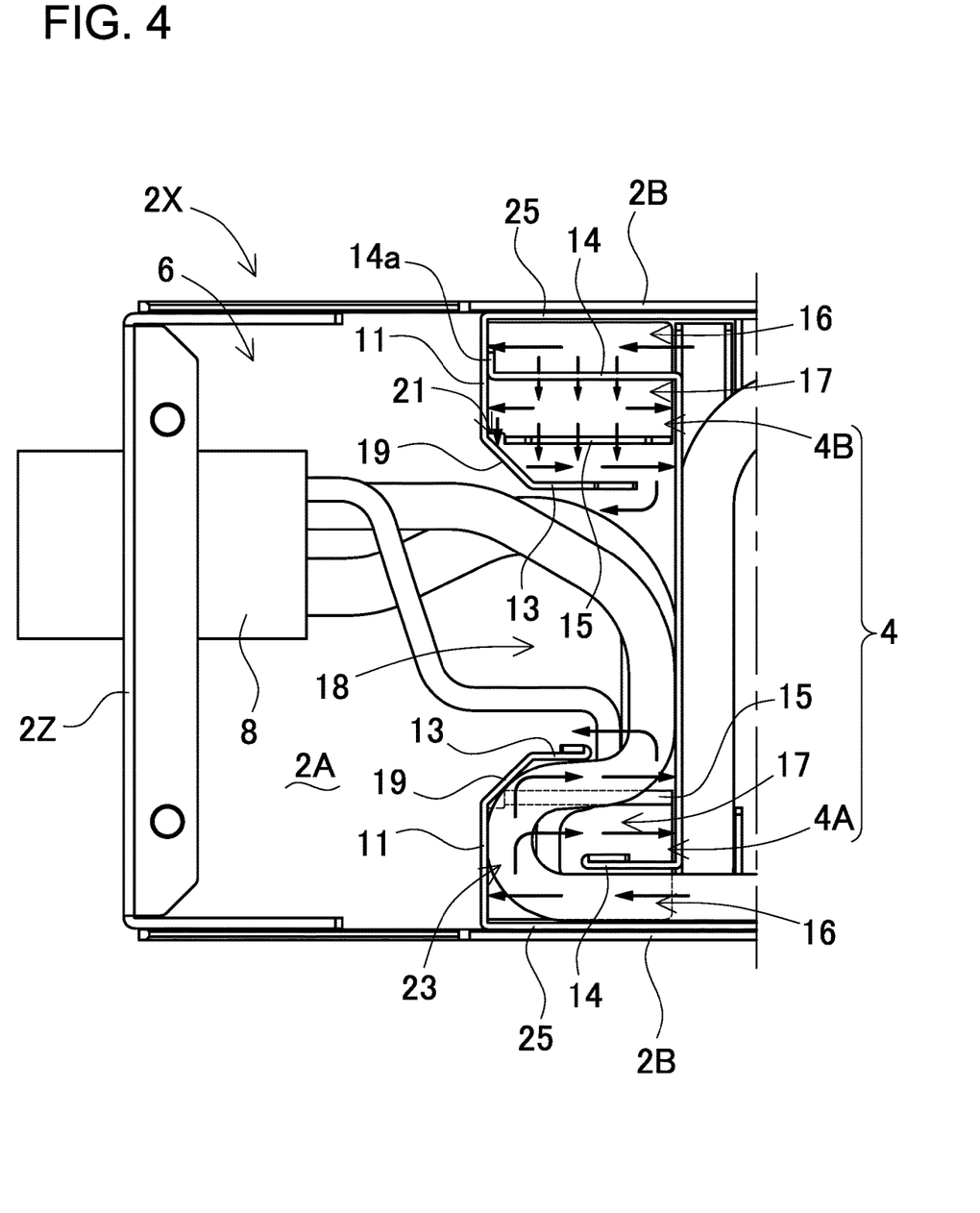
FIG. 4 is an enlarged plan view showing a part of the power supply device shown in FIG. 3.
Figure 5:
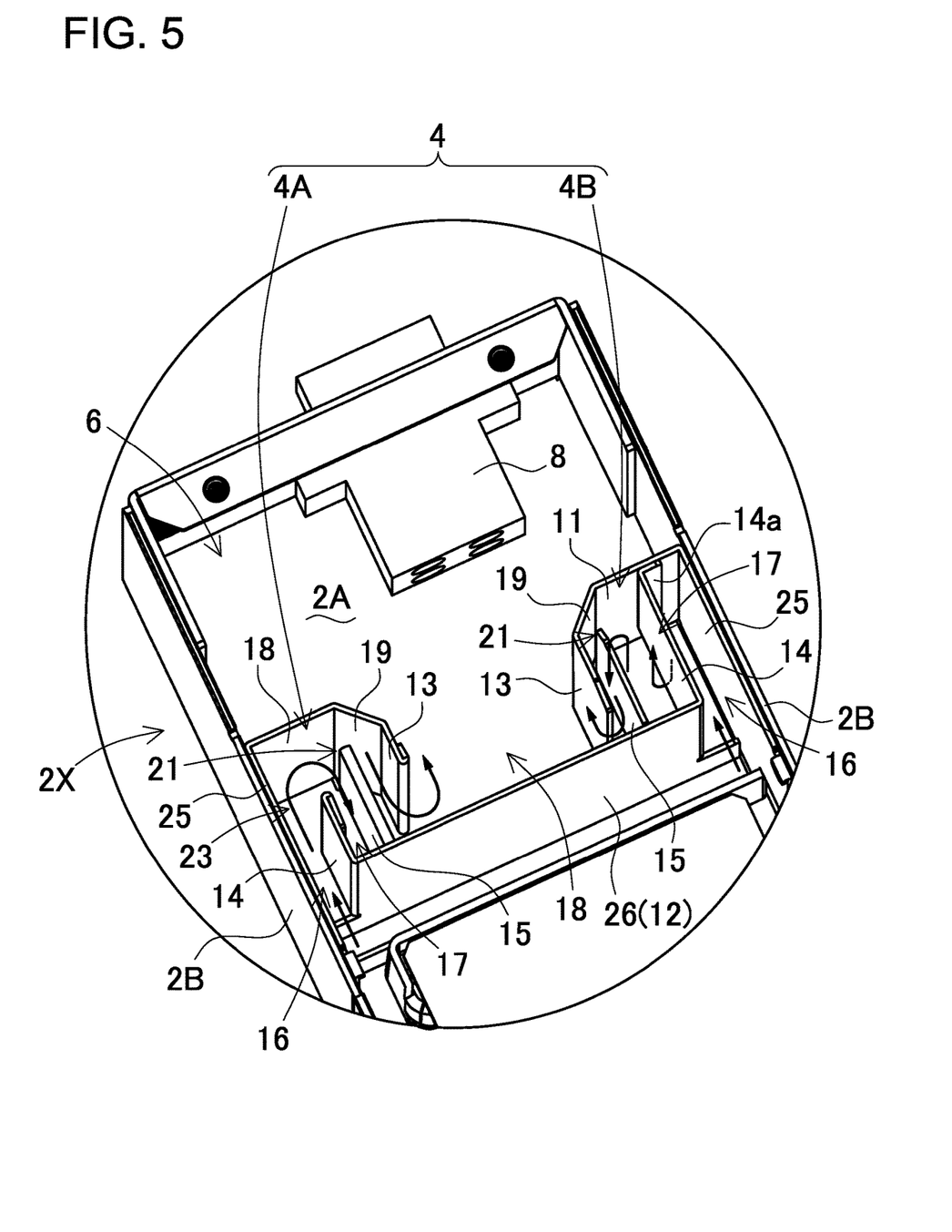
FIG. 5 is an enlarged cross-sectional perspective view showing structures of releasing paths of the power supply device shown in FIG. 4.
Figure 6:
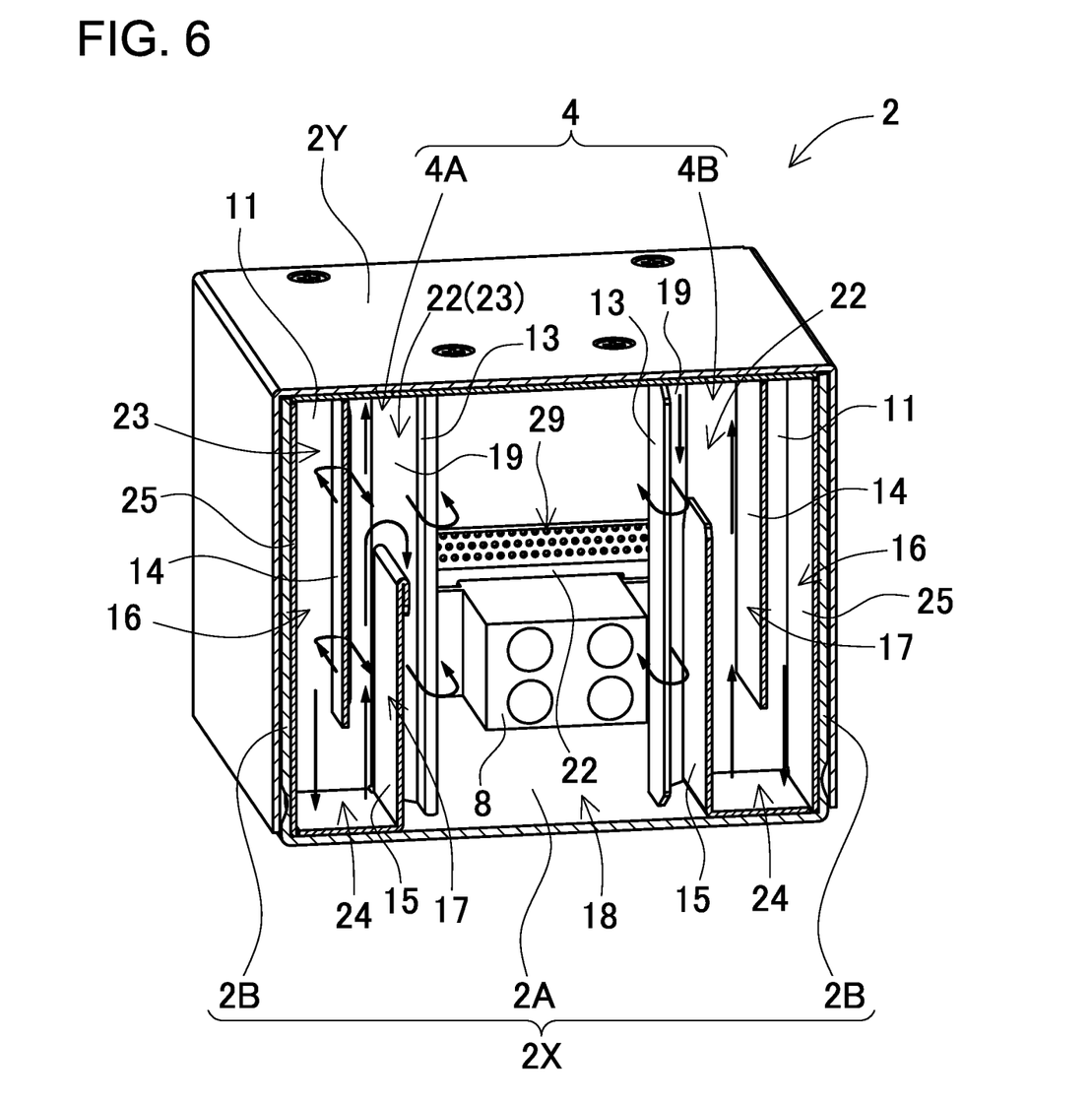
FIG. 6 is an enlarged cross-sectional perspective view of the structures of the releasing paths of the power supply device shown in FIG. 1 corresponding to a cross-sectional perspective view taken along a line VI-VI shown in FIG. 1.

The releasing path 4 includes a collision-enhancing structure in which thermal energy and kinetic energy of the discharged gas are reduced in collision against surfaces of the releasing path 4 as shown in FIGS. 4 to 6. The collision-enhancing type releasing path 4 includes first and second collision plates 11 and 12. The first collision plate 11 reflects a flowing direction of the gas discharged through the exhaust valves in collision of the gas against a surface of the first collision plate 11. The second collision plate 12 faces the first collision plate 11 so that the discharged gas reflected in collision against the first collision plate 11 collides against a surface of the second collision plate 11. Accordingly, the gas discharged through the exhaust valves collides against the first and second collision plates 11 and 12 when passing through the releasing path 4 before released to the outside.

Sparks emitted through the exhaust valves hit the first collision plate 11 and the second collision plate 12, which faces the first collision plate 11, in the releasing path 4. According to this the collision-enhancing structure, a path of the sparks, which are likely to travel in a straight line, can be cut off. In addition, the sparks can be cooled when hitting the collision plates. Accordingly, the sparks can disappear. As a result, the sparks can be prevented from emitted to the outside of the exterior case 2. Consequently, the sparks cannot exist on the outside as an ignition source from which the gas that is released to the outside of the exterior case starts to burn. That is, the discharged gas can be prevented from burning.

Inlet and outlet ducts 16 and 17 are formed on inlet and outlet sides of the releasing path 4, respectively. The gas discharged through the exhaust valve can be guided by the inlet duct 16 to the releasing path 4. Accordingly, the discharged gas, which flows at a high speed along the releasing path 4, will collide against a surface of the first collision plate 11. The inlet duct 16 can efficiently bring the discharged gas, which flows at a high speed, to collide against the first collision plate 11 so that thermal energy and kinetic energy of the discharged gas are efficiently reduced after the discharged gas passes through the inlet duct 16. The discharged gas that has collided against the second collision plate 12 will expand in a large volume of the outlet duct 17 so that the energy of the discharged gas can be further reduced. After that, the discharged gas having the reduced energy is released to the outside of the exterior case 2.

In addition, a reflection duct 18 and a second guide plate 14 are arranged on the releasing path 4 as shown in FIGS. 4 to 6. The reflection duct 18 guides, to the second collision plate 12, the discharged gas that is reflected in collision against the first collision plate 11. The second guide plate 14 separates the inlet duct 16 from the reflection duct 18. Because the discharged gas that is reflected by the first collision plate 11 and flows in the reflected flowing direction can be guided to the reflection duct 18, and the inlet duct 16 is separated from the reflection duct 18 by the second guide plate 14, the fast-flowing discharged gas after the collision against the first collision plate 11 can be efficiently brought into collision against the second collision plate 12. As a result, thermal energy and kinetic energy of the discharged gas can be efficiently reduced, and the discharged gas can be then released without emitting sparks to the outside of the case.

The first collision plate 11 and first guide plate 13 are integrally formed by bending a single metal plate. A beveled corner portion 19, which is inclined approximately 45 degrees with respect to the first collision plate 11 and the first guide plate 13, is formed in a corner part that is coupled to the first collision plate 11 and the first guide plate 13. The beveled corner portion 19 can smoothly guide, to the second collision plate 12, the discharged gas that collides against the first collision plate 11. The first guide plate 13 extends in the flowing direction of the discharged gas. The reflection duct 18 is formed between the first guide plate 13 and the second guide plate 14 to guide, to the second collision plate 12, the discharged gas that is reflected in collision against the first collision plate 11. According to the reflection duct 18, which is formed between the guide plates, the discharged gas that is reflected by the first collision plate 11 and flows in the reflected flowing direction is guided to a space between the first and second guide plates 13 and 14 to collide against the second collision plate 12. As a result, energy of the discharged gas can be efficiently reduced. In addition, sparks that are emitted to the outside of the case can be reduced.

A sub-plate 15 is additionally arranged between the first and second guide plates 13 and 14 on the releasing path 4 as shown in FIGS. 5 and 6. The first and second guide plates 13 and 14, and the sub-plate 15 extend parallel to each other, and guide the discharged gas in a direction parallel to their surface. One edge (left-side edge in FIG. 4) of the sub-plate 15 is spaced away from the first collision plate 11 so that a vertical gap 21 is formed between the sub-plate 15 and the first collision plate 11 to allow the discharged gas to pass through the vertical gap 21. The sub-plate 15 has a height lower than the first and second guide plates 13 and 14 so that an upper-edge gap 22 is formed between a cover plate 20 as a top plate and the sub-plate 15 as shown in FIG. 6. The wiring and non-wiring releasing paths 4A and 4B have the upper-edge gap 22. The upper-edge gap 22 in the wiring releasing path 4A also serves a wiring gap 23 through which the lead wires 7 pass. The discharged gas passed through the upper-edge gap 22 in the non-wiring releasing path 4B.

As shown in a cross-sectional perspective view of FIG. 6, a top side of the releasing path 4 is closed by the cover plate 20, and the first and second collision plates 11 and 12, and the first and second guide plates 13 and 14 are coupled to the cover plate 20 without gap on upper edges of the first and second collision plates 11 and 12, and the first and second guide plates 13 and 14. A bottom side of the releasing path 4 is closed by a bottom plate 2A of the main case part 2X of the exterior case 2. A lower edge of the sub-plate 15 is coupled to the bottom plate 2A of the exterior case 2. The upper-edge gap 22 is formed above an upper edge of the sub-plate 15. Accordingly, the upper-edge gap 22 is formed between the sub-plate 15 and the cover plate 20. The lead wires 7 are routed through the upper-edge gap 22, or the discharged gas passes through the upper-edge gap 22. The discharged gas that collides against the first collision plate 11 can be divided by the sub-plate 15 of the wiring releasing path 4A to bring the divided gas flows on both side of the sub-plate 15 into collision against the second collision plate 12. The discharged gas that flows through a passage gap 24 between the second guide plate 14 and the bottom plate 2A of the exterior case 2 will collide against a surface of the sub-plate 15 that is arranged on the non-wiring releasing path 4B. The discharged gas that flows upward along the surface of the sub-plate 15 will collide against a lower surface of the cover plate 20. The discharged gas that flows in a horizontal direction along the surface of the sub-plate 15 will collide against the second collision plate 12.

The first and second collision plates 11 and 12, the first and second guide plates 13 and 14, and the sub-plate 15 are formed of a metal plate. The metal plate is made of steel or a steel alloy and has a thickness of approximately 1 mm to provide sufficient strength for the discharged gas. Although a thicker metal plate can reduce a larger amount of thermal energy of the discharged gas, such a thicker metal plate may be too heavy. For this reason, the metal plate preferably has a thickness smaller than 2.5 mm, more preferably smaller than 2 mm. On the other hand, a thinner metal plate saves weight. However, a too much thin metal plate will not provide sufficient strength and will absorb a reduced amount of thermal energy of the discharged gas. For this reason, the metal plate preferably has a thickness greater than 0.5 mm. The collision and guide plates absorb thermal energy of discharged gas and conduct the heat to the exterior case 2. In consideration of strength and heat conduction, the exterior case 2 can be thicker than the collision and guide plates and can have, for example, a thickness of approximately 1.5 mm. The thick exterior case 2 can effectively absorb thermal energy of the discharged gas thermally conducted through the collision and guide plates and dissipate the energy whereby quickly reducing the energy. As a result, sparks emitted to the outside of the case can be reduced.

A single metal plate is sectioned by bending into the first collision plate 11, a fastening plate 25, the beveled corner portion 19, and the first guide plate 13. The fastening plate 25 is fastened onto an interior surface of a side plate 2B of the main case part 2X of the exterior case 2. The first collision plate 11 is coupled to the fastening plate 25 at a right angle. The beveled corner portion 19 is interposed between the first guide plate 13 and the first collision plate 11. The fastening plate 25 has an area larger than the first collision plate 11 and the first guide plate 13. Accordingly, the contact area between the fastening plate 25 and the side surface of the exterior case 2 can be large when the fastening plate 25 is brought in tight contact with and fastened onto the side surface of the exterior case 2. As a result, thermal energy absorbed by the first collision plate 11 can be efficiently thermally conducted through the fastening plate 25 to the exterior case 2. The fastening plate 25 and the first guide plate 13 extend parallel to each other. The first collision plate 11 extends perpendicular to the fastening plate and the first guide plate 13. The beveled corner portion 19 is inclined at 45 degrees with respect to the first collision plate 11 and first guide plate 13. The first collision plates 11 in the wiring and non-wiring releasing paths 4A and 4B arranged on both lateral sides of the duct area 6 have roughly the same shape formed by bending a single metal plate. More specifically, the first guide plate 13 arranged in the wiring releasing path 4A has a U-bent edge that is formed by bending a free edge of the first guide plate 13 into a U shape. The U-bent edge can prevent a sheath (cover) of the lead wires 7 from being damaged.

The second collision plate 12 and two second guide plates 13 that are arranged on both sides of the duct area 6 are integrally formed by bending a single metal plate. More specifically, the metal plate is bent into a rectangular U shaped so that a pair of second guide plates 14 arranged in the wiring and non-wiring releasing paths 4A and 4B are coupled to both lateral sides of a coupling plate 26. The second guide plate 14 that is arranged in the non-wiring releasing path 4B has a fastening portion 14a, which is formed by bending an end edge of the second guide plate 14 at a right angle. The fastening portion 14a is fastened to the first collision plate 11. The passage gap 24 is formed between a lower edge of the second guide plate 14 and the bottom plate 2A of the exterior case 2. The discharged gas can pass through the passage gap 24. The second guide plate 14 that is arranged in the wiring releasing path 4A has a U-bent edge, which is formed by bending an end edge of the second guide plate 14. The wiring gap 23 is formed between the U-bent edge and the first collision plate 11. The passage gap 24 is formed between a lower edge of the second guide plate 14 and the bottom plate 2A of the exterior case 2. The U-bent edge, which contacts the lead wires 7, can prevent the cover of the lead wires 7 from being damaged.

The lower edge of the sub-plate 15 is coupled to the bottom plate 2A of the exterior case 2 without gap. The vertical gap 21, which extends in a vertical direction, is formed between the one edge (left-side edge in FIG. 4) of the sub-plate 15 and the first collision plate 11. The discharged gas that flows in the reflection duct 18 can pass through the vertical gap 21.

The power supply device shown in FIG. 2 has exhaust opening portions 29 in the end surface plates 2Z, which are arranged on both longitudinal ends of the elongated exterior case 2. The discharged gas can be released through the exhaust opening portions 29 to the outside. The discharged gas flows into the outlet ducts 17 and is then released through the exhaust opening portions 29 to the outside of the case. The connector 8 is fastened to the end surface plate 2Z of the exterior case 2. No gap is formed between the fastened connector 8 and the end surface plate 2Z. The connector 8 is connected to the battery block 10 by the lead wires 7. The battery block 10 can be connected to external equipment through the connector 8. The connector 8 can receive a wire harness (not shown) connected to the external equipment.

Connection terminals to which the lead wires 7 are connected by soldering or caulking are arranged in the duct area 6. The lead wires 7 are routed in the duct area 6. The lead wires 7, which are routed in the duct area 6, are sheathed in a heat-resistant tube capable of resisting high temperature discharged gas. The lead wires 7 are routed through the inlet and outlet ducts 16 and 17 of the wiring releasing path 4A. The lead wires 7 pass through a gap between the edge of the first guide plate 13 and the second collision plate 12, a gap between the first guide plate 13 and the second guide plate 14, the wiring gap 23 formed between the edge of the second guide plate 14 and the first collision plate 11, and the inlet duct 16. The lead wires 7 pass through the gas-releasing path through which the discharged gas is released to the outside. For this reason, dissimilar to conventional power supply devices, any bushing penetrating the exterior case 2 is not required. The route of the lead wires 7 corresponds to the path through which the discharged gas flows.

Correspondingly, the lead wires 7 meander along the gas-releasing path. The lead wires 7 are turned along the U-bent edges of the first and second guide plates 13 and 14 as shown FIG. 4 so that the battery block 10 is connected to the connector 8.

According to the aforementioned power supply device 100, the discharged gas emitted through the exhaust valves of the batteries 1 is released through the releasing paths 4 to the outside of the case. More specifically, the discharged gas is released through the wiring and non-wiring releasing paths 4A and 4B to the outside of the case. The discharged gas that will be discharged through the wiring releasing path 4A flows into the duct area 6 from the battery accommodation area 5, and is then released to the outside of the case. The discharged gas that flows into the duct area 6 flows at a high speed through the inlet duct 16 and will collide against the first collision plate 11 so that thermal energy and kinetic energy of the discharged gas are reduced by the first collision plate 11. Subsequently, the discharged gas is reflected and flows in a reflected direction through the reflection duct 18 and will collide against the second collision plate 12 so that thermal energy and kinetic energy of the discharged gas are further reduced by the second collision plate 12. After that, the discharged gas flows from the outlet duct 17 toward the exhaust opening portion 29 and is released without sparks to the outside of the case. The discharged gas that will be discharged through the non-wiring releasing path 4B flows at a high speed through the inlet duct 16 and will collide against the first collision plate 11 so that thermal energy and kinetic energy of the discharged gas are reduced by the first collision plate 11. Subsequently, the discharged gas will pass through the passage gap 24 formed between the second guide plate 14 and the bottom plate 2A of the exterior case 2 and flow into the reflection duct 18. The discharged gas will collide against the sub-plate 15, and then collide against the cover plate 20 and the second collision plate 12 so that thermal energy and kinetic energy of the discharged gas are further reduced. Subsequently, the discharged gas will pass through the upper-edge gap 22 and the vertical gap 21. After that, the discharged gas flows from the outlet duct 17 toward the exhaust opening portion 29 and is released without sparks to the outside of the case.

The power supply device 100 has the releasing paths 4 which are arranged on both lateral sides of the longitudinal end parts of the exterior case 2 as shown in FIGS. 2 and 3. Accordingly, the discharged gas can be released through the releasing paths 4, which are arranged in both duct areas 6. Also, if the exhaust valve in one longitudinal end parts of the battery block 10 closer to corresponding one of the duct area 6 opens, a larger amount of the discharged gas can be released through the releasing paths 4 in the corresponding duct area 6, which is arranged closer to the exhaust valve that opens. The power supply device 100 includes the plastic battery holder 3 accommodated in the exterior case 2. If the battery holder 3 is melted by heat of the discharged gas, melted plastic may be discharged together with the discharged gas. The melted plastic has a specific gravity larger than the discharged gas. The melted plastic will flow on the bottom of the exterior case 2 when discharged. In this case, the passage gap 24, which is formed between the lower edge of the second guide plate 14 and the bottom, may be closed by the melted plastic. According to the illustrated power supply device, the inlet duct 16 in the wiring releasing path 4A has a vertically elongated opening that extends in a vertical direction. For this reason, even if a lower part of the vertically elongated opening is closed by such melted plastic, discharged gas can be released through an upper part of the vertically elongated opening, which is not closed by the melted plastic.

The power supply device according to the present disclosure can be suitably used as a power supply device that includes a number of batteries accommodated in its exterior case.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims.

The invention claimed is:

1. A power supply device comprising:
a plurality of batteries, each of the plurality of batteries including an exhaust valve configured to open if an internal pressure becomes higher than a predetermined pressure; and
an exterior case that accommodates the plurality of batteries and includes a collision-enhancing releasing path for releasing a gas discharged through the exhaust valve to an outside of the exterior case,
wherein the exterior case opens at an exhaust opening portion,
wherein the exterior case includes:
a battery accommodation area that accommodates a battery block including the plurality of batteries arranged in a predetermined place; and
a duct area that is arranged between the battery accommodation area and an end of the exterior case,
wherein the duct area includes the collision-enhancing releasing path in part, the duct area being configured to release the gas from the collision-enhancing releasing path to a space which is within the duct area and outside the collision-enhancing releasing path,
wherein the space is positioned between the collision-enhancing releasing path and the exhaust opening portion for communication between the collision-enhancing releasing path and the outside of the exterior case via the exhaust opening portion,
wherein the space has a larger volume than the collision-enhancing releasing path for reducing an energy of the gas released from the collision-enhancing releasing path to the space,
wherein the collision-enhancing releasing path includes:
a first collision plate configured to reflect a flow direction of the gas by collision of the gas against a surface of the first collision plate; and
a second collision plate that faces the first collision plate for: (i) collision of the gas against the first collision plate and the second collision plate; and (ii) release of the gas from the collision-enhancing releasing path to the space and the outside of the exterior case via the exhaust opening portion,
wherein the collision-enhancing releasing path is positioned at a corner of the space within the duct area, and
wherein the space is wider than the collision-enhancing releasing path in a transverse direction of the exterior case.

2. The power supply device according to claim 1,
wherein the collision-enhancing releasing path includes an inlet duct on an inlet side of the collision-enhancing releasing path and an outlet duct on an outlet side of the collision-enhancing releasing path for:
passage of the gas through the inlet duct and collision of the gas against the surface of the first collision plate; and
collision of the gas against the second collision plate and release of the gas through the outlet duct to the outside of the exterior case.

3. The power supply device according to claim 2,
wherein the collision-enhancing releasing path includes:
a reflection duct configured to guide the gas from the first collision plate to the second collision plate; and
a second guide plate that separates the inlet duct from the reflection duct.

4. The power supply device according to claim 3,
wherein the collision-enhancing releasing path includes a first guide plate that is coupled to the first collision plate and extends in the outlet duct in parallel to the flow direction of the gas, and
wherein the first guide plate is configured to guide the gas from the first collision plate to the second collision plate.

5. The power supply device according to claim 4,
wherein the collision-enhancing releasing path includes a sub-plate that is arranged between the first and second guide plates, and
wherein a vertical gap is defined between the sub-plate and the first collision plate to allow the gas to pass through the vertical gap.

6. The power supply device according to claim 5,
wherein the first and second collision plates, and the first and second guide plates are coupled to an upper plate of the exterior case without gaps on upper edges of the first and second collision plates, and the first and second guide plates, and
wherein an upper-edge gap is defined between an upper edge of the sub-plate and the upper plate of the exterior case.

7. The power supply device according to claim 6, wherein the first and second collision plates, the first and second guide plates, and the sub-plate are formed of a metal plate.

8. The power supply device according to claim 1, wherein the collision-enhancing releasing path is one of a plurality of collision-enhancing releasing paths.

9. The power supply device according to claim 8,
wherein the exterior case has a rectangular parallelepiped shape having a width and a length longer than the width, and
wherein a first of the plurality of collision-enhancing releasing paths is arranged in a first longitudinal end part of the exterior case and a second of the plurality of collision-enhancing releasing paths is arranged in a second longitudinal end part of the exterior case.

10. The power supply device according to claim 9,
wherein the first of the plurality of collision-enhancing releasing paths is arranged in each of both lateral sides of the first longitudinal end part of the exterior case, and
wherein the second of the plurality of collision-enhancing releasing paths is arranged in each of both lateral sides of the second longitudinal end part of the exterior case.

11. The power supply device according to claim 1, further comprising a connector that is connected to the battery block by lead wires,
wherein the connector is fastened to a part of the exterior case that closes the duct area, and
wherein the lead wires pass from the inlet duct of the collision-enhancing releasing path to the outlet duct of the collision-enhancing releasing path.

12. The power supply device according to claim 11,
wherein the exterior case includes an end surface plate defining a part of the duct area, and
wherein the exhaust opening portion is one of a plurality of exhaust opening portions defined in the end surface plate.

13. The power supply device according to claim 11, wherein the collision-enhancing releasing path is one of a plurality of collision-enhancing releasing paths including a wiring releasing path that holds the lead wires, and a non-wiring releasing path without the lead wires inside.

14. The power supply device according to claim 13,
wherein, in the wiring releasing path: (i) a first wiring gap is defined between an edge of a first guide plate and the second collision plate; and (ii) a second wiring gap is defined between an edge of a second guide plate and the first collision plate,
wherein the edge of the first guide plate is a U-shaped bend of the first guide plate and the edge of the second guide plate is a U-shaped bend of the second guide plate, and
wherein the lead wires pass through the first wiring gap and the second wiring gap.

15. The power supply device according to claim 13, wherein, in the wiring releasing path, an inlet duct has a vertically elongated opening that extends in a vertical direction.

16. The power supply device according to claim 14, wherein, in the non-wiring releasing path, the second guide plate is coupled to the first collision plate, and a passage gap is defined between a lower edge of the second guide plate and a lower plate of the exterior case to allow the gas to pass through the passage gap.

17. The power supply device according to claim 1, further comprising a battery holder that is accommodated in the exterior case and holds the plurality of batteries in the predetermined place,
wherein an inlet duct has a vertically elongated opening that extends in a vertical direction.

18. The power supply device according to claim 1,
wherein the exterior case includes an end surface plate defining a part of the duct area, and
wherein the exhaust opening portion is one of a plurality of exhaust opening portions defined in the end surface plate.

19. The power supply device according to claim 1,
wherein the duct area is one of a pair of duct areas,
wherein the exterior case has a rectangular shape which is elongated in a longitudinal direction and includes a first end surface and a second end surface,
wherein the exterior case defines: (i) the battery accommodation area in a middle of the longitudinal direction; and (ii) the pair of duct areas,
wherein a first of the pair of duct areas is positioned between the battery accommodation area and the first end surface, and a second of the pair of duct areas is positioned between the battery accommodation area and the second end surface, and
wherein each of the pair of duct areas includes two of the collision-enhancing releasing paths, and the respective first collision plates of the two of the collision-enhancing releasing paths are spaced apart and positioned at respective end parts in the transverse direction of the exterior case.

20. The power supply device according to claim 19,
wherein, in each of the pair of duct areas, the second collision plate is elongated and common to the respective first collision plates of the two of the collision-enhancing releasing paths, and the second collision plate is an integrally formed bent metal plate for:
collision of the gas against the respective first collision plates of the two of the collision-enhancing releasing paths and against the second collision plate; and
release of the gas from each of the two of the collision-enhancing releasing paths positioned on respective sides of the duct area to the space through an area spaced apart between the respective first collision plates of the two of the collision-enhancing releasing paths to the outside of the exterior case.

* * * * *